United States Patent
Nakayama

(10) Patent No.: US 11,459,494 B2
(45) Date of Patent: Oct. 4, 2022

(54) SILICONE COMPOSITION FOR RELEASE PAPER OR RELEASE FILM, AND RELEASE PAPER AND RELEASE FILM

(71) Applicant: SHIN-ETSU CHEMICAL CO., LTD., Tokyo (JP)

(72) Inventor: Ken Nakayama, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 339 days.

(21) Appl. No.: 15/741,373

(22) PCT Filed: Jul. 5, 2016

(86) PCT No.: PCT/JP2016/069855
§ 371 (c)(1),
(2) Date: Jan. 2, 2018

(87) PCT Pub. No.: WO2017/010340
PCT Pub. Date: Jan. 19, 2017

(65) Prior Publication Data
US 2019/0002746 A1 Jan. 3, 2019

(30) Foreign Application Priority Data
Jul. 16, 2015 (JP) .............................. JP2015-142132

(51) Int. Cl.
| | | |
|---|---|---|
| *C09D 183/04* | (2006.01) | |
| *C09J 183/04* | (2006.01) | |
| *C08G 77/20* | (2006.01) | |
| *B32B 27/00* | (2006.01) | |
| *C09J 7/40* | (2018.01) | |
| *C08G 77/16* | (2006.01) | |
| *C08G 77/14* | (2006.01) | |
| *C08G 77/12* | (2006.01) | |

(52) U.S. Cl.
CPC .............. *C09J 183/04* (2013.01); *B32B 27/00* (2013.01); *C08G 77/20* (2013.01); *C09D 183/04* (2013.01); *C09J 7/40* (2018.01); *C09J 7/401* (2018.01); *C08G 77/12* (2013.01); *C08G 77/14* (2013.01); *C08G 77/16* (2013.01); *C09J 2400/283* (2013.01); *C09J 2483/005* (2013.01)

(58) Field of Classification Search
CPC ......... C08L 83/00; C09D 183/04; C08K 5/56; B32B 2255/12; B32B 2255/26; B32B 2307/748; B32B 27/00; B32B 27/10; B32B 27/28; B32B 27/281; B32B 27/32; B32B 27/34; B32B 27/36; B32B 27/365; B32B 27/42; B32B 29/005; B32B 7/06; B32B 7/12; C08G 77/12; C08G 77/14; C08G 77/16; C08G 77/20; C09J 183/04; C09J 2400/283; C09J 2483/005; C09J 7/40; C09J 7/401; C09K 3/00; D21H 19/32; D21H 27/001
See application file for complete search history.

(56) References Cited

U.S. PATENT DOCUMENTS

| | | | | |
|---|---|---|---|---|
| 4,728,571 A | * | 3/1988 | Clemens | ............. C08F 290/068 428/352 |
| 9,365,746 B2 | | 6/2016 | Yamamoto et al. | |
| 9,562,149 B2 | | 2/2017 | Cray et al. | |
| 2006/0177673 A1 | * | 8/2006 | Ikeno | ................... C09D 183/04 428/447 |
| 2006/0286390 A1 | * | 12/2006 | Yaginuma | ............ C09D 183/04 428/447 |
| 2011/0274935 A1 | * | 11/2011 | Yamamoto | ........... C09D 183/04 428/447 |

FOREIGN PATENT DOCUMENTS

| | | | |
|---|---|---|---|
| EP | 2 444 463 A1 | | 4/2012 |
| EP | 2444463 | * | 12/2012 |
| EP | 2 671 933 A1 | | 12/2013 |
| JP | 47-032072 A | | 11/1972 |
| JP | 4-323284 A | | 11/1992 |
| JP | 2965231 B2 | | 10/1999 |
| JP | 2011-132532 A | | 7/2011 |
| JP | 2011-132532 | * | 12/2011 |
| JP | 2011-252142 A | | 12/2011 |
| JP | 5507246 B2 | | 5/2014 |
| JP | 5626097 B2 | | 11/2014 |
| JP | 2016-023288 A | | 2/2016 |

OTHER PUBLICATIONS

Machine translation of JP 2011-132532, retrieved Mar. 16, 2020.*
International Search Report (PCT/ISA/210) issued in PCT/JP2016/069855, dated Sep. 6, 2016.
Written Opinion (PCT/ISA/237) issued in PCT/JP2016/069855, dated Sep. 6, 2016.
Extended European Search Report dated Nov. 22, 2018, in European Patent Application No. 16824320.2.

* cited by examiner

*Primary Examiner* — Michael B Nelson
(74) *Attorney, Agent, or Firm* — Birch, Stewart, Kolasch & Birch, LLP

(57) ABSTRACT

A compound that is devoid of epoxy groups and has a quantity of alkenyl groups corresponding to 5-1000 times the alkenyl content of a base polymer, and/or an organopolysiloxane that is devoid of alkenyl groups, has an average degree of polymerization of 2-50, and contains, per molecule, 30 mol % or more of siloxane units having epoxycyclohexyl groups bonded to silicon atoms via carbon atoms, are/is blended with a silicone composition for a release film as adhesion-enhancing components.

13 Claims, No Drawings

SILICONE COMPOSITION FOR RELEASE PAPER OR RELEASE FILM, AND RELEASE PAPER AND RELEASE FILM

TECHNICAL FIELD

This invention relates to a release paper or film-forming silicone composition which is fully curable and forms a release coating which has improved adhesion to a substrate, especially a plastic film substrate such as polyester film, has satisfactory substrate adhesion even when the release coating has a low release force, and maintains satisfactory substrate adhesion over a long term even when the release coating is held under rigorous conditions of high temperature/humidity, and a release paper or film having a cured coating of the silicone composition formed thereon.

BACKGROUND ART

In the prior art, sheet-like substrates such as paper and plastic sheets are given release properties relative to pressure-sensitive adhesives (PSAs) by forming a cured coating of silicone composition on the surface of the substrates.

With respect to the formation of a cured coating of silicone composition on the substrate surface, for example, JP-A S47-32072 (Patent Document 1) describes a method for forming a release coating on a substrate surface by effecting addition reaction of an alkenyl-containing organopolysiloxane and an organohydrogenpolysiloxane in the presence of a platinum base compound catalyst.

Although the silicone composition of this type has satisfactory adhesion to paper substrates, the problems that its adhesion to plastic films such as polyester film and polypropylene film is poor, and these substrates must be pretreated have hitherto been pointed out.

As the method for improving substrate adhesion, JP 2965231 (Patent Document 2) reports a composition comprising a base polymer of branched structure containing $RSiO_{3/2}$ units. This method, however, lacks practical utility because the expense of preparation is increased by using a large amount of alkenyl-containing organopolysiloxane of branched structure.

As the method for improving substrate adhesion using a small amount of additive, JP-A 2011-132532 (Patent Document 3) reports the addition of an epoxy-containing organopolysiloxane. This method refers to only substrate adhesion under high temperature/humidity conditions, but not to adhesion immediately after curing or after room temperature storage. It is described nowhere how release properties are affected by the addition of epoxy-containing organopolysiloxane.

JP 5507246 (Patent Document 4) intends to improve substrate adhesion by adding the reaction product of a liquid polyorganosiloxane containing alkenyl and silanol groups with a hydrolyzable silane containing an epoxide group. However, the influence on release properties by the addition of the reaction product is discussed nowhere.

JP 5626097 (Patent Document 5) is to add an alkenyl-containing low molecular weight siloxane, irradiating ultraviolet radiation, and heating to cure the coating, for thereby improving substrate adhesion without any impact on release properties. This method, however, needs a UV-irradiating unit as well as a heating dryer.

Recently, not only a lower release force than conventional products, but also a high durability sufficient to maintain satisfactory substrate adhesion even under a rigorous environment of high temperature/humidity during the step of shaping release film are required as the release film performance. However, the existing release film-forming compositions have the tendency that a composition having a lower release force is poorer in substrate adhesion. With respect to long-term adhesion under a more rigorous environment, few compositions capable of satisfying the requirement are found. The cause is believed to reside in that many of materials which are effective for release force lightening, for example, materials used as the migratory component function to reduce substrate adhesion. At the present, it is difficult to establish both low release force and satisfactory substrate adhesion in a compatible manner.

As discussed above, an appropriate method capable of imparting both low release force and satisfactory substrate adhesion to a silicone composition is not known in the state-of-the-art.

PRIOR ART DOCUMENTS

Patent Documents

Patent Document 1: JP-A S47-32072
Patent Document 2: JP 2965231
Patent Document 3: JP-A 2011-132532
Patent Document 4: JP 5507246
Patent Document 5: JP 5626097

SUMMARY OF THE INVENTION

Problems to be Solved by the Invention

An object of the invention, which has been made under the above-mentioned circumstances, is to provide a release paper or film-forming silicone composition which forms a release coating that exhibits improved adhesion to a substrate, especially a plastic film substrate and a low release force, and maintains satisfactory substrate adhesion over a long term even in a rigorous environment of high temperature/humidity.

Another object is to provide a release paper and film having a cured coating of the composition formed thereon.

Means for Solving the Problems

Making extensive investigations to attain the above object, the inventor has found that by incorporating an epoxy-free compound containing alkenyl groups in a content corresponding to 5 to 1,000 times the alkenyl content of the base polymer, and/or an alkenyl-free organopolysiloxane containing at least 30 mol % per molecule of siloxane units having an epoxycyclohexyl group bonded to silicon via carbon, and having an average degree of polymerization of 2 to 50, as an adhesion improving component in a conventional release film-forming silicone composition, there is obtained a cured coating having satisfactory substrate adhesion.

Also, although the prior art adhesion improving means has the problem that a composition with a low release force fails to achieve sufficient substrate adhesion, the inventive composition is successful in establishing a low release force and satisfactory substrate adhesion at the same time, and maintaining the satisfactory substrate adhesion over a long term. The invention is predicated on these findings.

Accordingly, the invention provides a release paper or film-forming silicone composition and a release paper or film as defined below.

[1] A release paper or film-forming silicone composition of addition cure type comprising (A) 100 parts by weight of an organopolysiloxane containing at least two alkenyl groups per molecule and having an alkenyl content of 0.001 to 0.2 mol/100 g and a 30 wt % toluene dilution viscosity at 25° C. of 0.01 to 70 Pa·s, (B) an adhesion improving component in the form of the following compound (B1) and/or compound (B2):

(B1) 0.1 to 30 parts by weight of a compound containing at least two alkenyl groups per molecule, having an alkenyl content corresponding to 5 to 1,000 times the alkenyl content of component (A), being free of epoxy groups, and having a viscosity at 25° C. of less than 1 Pa·s or a 30 wt % toluene dilution viscosity of less than 0.1 Pa·s, and/or (B2) 0.1 to 20 parts by weight of an organopolysiloxane containing at least 30 mol % per molecule of siloxane units having an epoxycyclohexyl group bonded to a silicon atom via a carbon atom, being free of alkenyl groups, and having an average degree of polymerization of 2 to 50, (C) an organohydrogenpolysiloxane containing at least two silicon-bonded hydrogen atoms per molecule, in such an amount that the moles of silicon-bonded hydrogen atoms corresponds to 0.5 to 10 times the moles of alkenyl groups in components (A) and (B1), (D) a catalytic amount of a platinum group metal base catalyst, and (E) 0 to 20,000 parts by weight of an organic solvent or water.

[2] The release paper or film-forming silicone composition of [1] wherein component (B2) is a compound of linear or cyclic siloxane structure having the general formula (1) or (2):

[Chemical Formula 1]

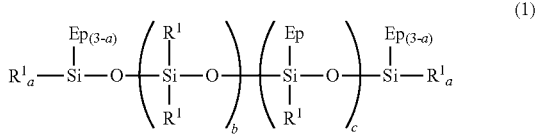

(1)

wherein Ep is a monovalent organic group having epoxycyclohexyl, $R^1$ which may be identical or different is a substituted or unsubstituted $C_1$-$C_{20}$ monovalent hydrocarbon group free of aliphatic unsaturation, hydrogen, hydroxyl, $C_1$-$C_{10}$ alkoxy group, or $C_4$-$C_{30}$ alkoxysilylalkyl group, a is an integer of 0 to 3, b is an integer of 0 to 33, c is an integer of 0 to 48, b+c is 0 to 48, and are selected so as to satisfy that the organopolysiloxane contains at least 30 mol % of epoxycyclohexyl-containing siloxane units,

[Chemical Formula 2]

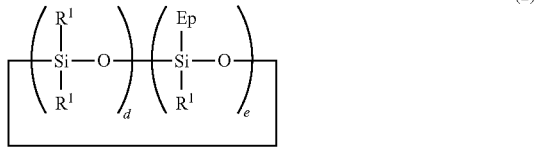

(2)

wherein Ep and $R^1$ are as defined above, d is an integer of 0 to 3, e is an integer of 1 to 6, d+e is 3 to 6, and are selected so as to satisfy that the organopolysiloxane contains at least 30 mol % of epoxycyclohexyl-containing siloxane units.

[3] The release paper or film-forming silicone composition of [1] or [2], further comprising, per 100 parts by weight of component (A), (F) 0.1 to 20 parts by weight of a release force controlling component comprising an acrylic-silicone graft copolymer obtained from radical polymerization of (a) an organopolysiloxane compound having an acrylic and/or methacrylic group, represented by the general formula (3), and (b) a radically polymerizable monomer having one radically polymerizable group per molecule, the graft copolymer having a weight average molecular weight of 1,000 to 100,000,

[Chemical Formula 3]

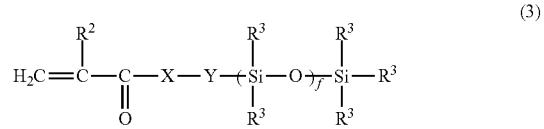

(3)

wherein $R^2$ is hydrogen or methyl, X is a group selected from oxygen, NH and sulfur, Y is a $C_1$-$C_{12}$ divalent hydrocarbon group which may be separated by an oxygen atom, $R^3$ which may be identical or different is a substituted or unsubstituted $C_1$-$C_{20}$ monovalent hydrocarbon group, hydrogen, hydroxyl, $C_1$-$C_{10}$ alkoxy group or substituent group having the general formula (4):

[Chemical Formula 4]

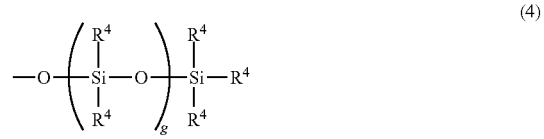

(4)

wherein $R^4$ which may be identical or different is a substituted or unsubstituted $C_1$-$C_{20}$ monovalent hydrocarbon group, hydrogen, hydroxyl or $C_1$-$C_{10}$ alkoxy group, and g is an integer of 0 to 300.

[4] A release paper or film which is obtained by coating the release paper or film-forming silicone composition of any one of [1] to [3] onto a paper or film substrate, and curing the composition.

Advantageous Effects of the Invention

The release paper or film-forming silicone composition of the invention is capable of forming a non-tacky cured coating having a low release force and improved substrate adhesion. Although the prior art adhesion improving means inevitably have impacts on release properties, the release paper or film having a cured coating of the inventive release paper or film-forming silicone composition formed thereon exhibits improved substrate adhesion without substantial impacts on release properties.

EMBODIMENT FOR CARRYING OUT THE INVENTION

Now the invention is described in detail.
The release paper or film-forming silicone composition of invention is an addition curable silicone composition comprising (A) an organopolysiloxane containing at least two alkenyl groups per molecule and having an alkenyl content of 0.001 to 0.2 mol/100 g and a 30 wt % toluene dilution viscosity at 25° C. of 0.01 to 70 Pa·s, (B) an adhesion improving component in the form of the following compound (B1) and/or compound (B2):

(B1) a compound containing at least two alkenyl groups per molecule, having an alkenyl content corresponding to 5 to 1,000 times the alkenyl content of component (A), being free of epoxy groups, and having a viscosity at 25° C. of less than 1 Pa·s or a 30 wt % toluene dilution viscosity of less than 0.1 Pa·s, and/or (B2) an organopolysiloxane containing at least 30 mol % per molecule of siloxane units having an epoxycyclohexyl group bonded to a silicon atom via a carbon atom, being free of alkenyl groups, and having an average degree of polymerization of 2 to 50, (C) an organohydrogenpolysiloxane containing at least two silicon-bonded hydrogen atoms per molecule, (D) a platinum group metal base catalyst, and optionally, (E) an organic solvent or water.

[(A): Alkenyl-Containing Organopolysiloxane]

Component (A) used herein is an organopolysiloxane containing at least two alkenyl groups per molecule and having an alkenyl content of 0.001 to 0.2 mol/100 g and a 30 wt % toluene dilution viscosity at 25° C. of 0.01 to 70 Pa·s, preferably represented by the following general formula (5).

[Chemical Formula 5]

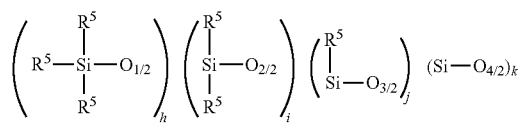

(5)

In formula (5), $R^5$ which may be identical or different is a substituted or unsubstituted $C_1$-$C_{20}$ monovalent hydrocarbon group free of aliphatic unsaturation, or a $C_2$-$C_{12}$ alkenyl group which may be separated by an oxygen atom, at least two of $R^5$ being alkenyl.

Exemplary of the $C_1$-$C_{20}$ monovalent hydrocarbon group free of aliphatic unsaturation are $C_1$-$C_{10}$ monovalent hydrocarbon groups including $C_1$-$C_6$ alkyl groups such as methyl, ethyl, propyl and butyl, $C_5$-$C_8$ cycloalkyl groups such as cyclohexyl, $C_6$-$C_{10}$ aryl groups such as phenyl and tolyl, $C_7$-$C_{10}$ aralkyl groups such as benzyl, or substituted forms of the foregoing in which one or more or even all of carbon-bonded hydrogen atoms are substituted by hydroxyl, cyano, halogen or the like, such as hydroxypropyl, cyanoethyl, 3-chloropropyl, and 3,3,3-trifluoropropyl. Especially from the standpoint of release properties, alkyl and aryl groups are preferred, with methyl, ethyl, propyl and phenyl being more preferred.

Preferred examples of the $C_2$-$C_{12}$ alkenyl group which may be separated by an oxygen atom are groups of the formula: —$(CH_2)_x$—CH=$CH_2$ wherein x is 0 or an integer of 1 to 10, for example, vinyl, propenyl, butenyl, hexenyl, octenyl, and decenyl. The alkenyl group may contain an ether bond in its methylene chain, for example, —$(CH_2)_2$—O—$CH_2$—CH=$CH_2$ and —$(CH_2)_3$—O—$CH_2$—CH=$CH_2$. Inter alia, vinyl is preferred.

The organopolysiloxane as component (A) contains at least two alkenyl groups per molecule. Less than 2 alkenyl groups are undesirable because of a strong possibility that uncrosslinked molecules are left and hence, a less curability. An alkenyl content per 100 g of the organopolysiloxane is preferably 0.001 to 0.2 mole, more preferably 0.002 to 0.15 mole. A content of less than 0.001 mole may lead to a less curability whereas a content of more than 0.2 mole may lead to a high release force.

Component (A) has a viscosity at 25° C. in the range of 0.01 to 70 Pa·s as a 30 wt % toluene dilution viscosity, desirably 0.01 to 60 Pa·s as a 30 wt % toluene dilution viscosity, more desirably 0.01 to 50 Pa·s as a 30 wt % toluene dilution viscosity. A 30 wt % toluene dilution viscosity of less than 0.01 Pa·s leads to ineffective coating of the composition whereas a 30 wt % toluene dilution viscosity in excess of 70 Pa·s leads to inefficient working. Notably, the viscosity may be measured by a rotational viscometer (the same holds true hereinafter).

In formula (5), h, i, j and k are selected from positive numbers so as to meet a viscosity in the above range, specifically h is an integer of at least 2, preferably 2 to 300, i is an integer of at least 100, preferably 148 to 19,998, more preferably 198 to 14,700, j is an integer of at least 0, preferably 0 to 100, k is an integer of at least 0, preferably 0 to 100, 150≤h+i+j+k≤20,000, preferably 200≤h+i+j+k≤15,000.

Examples of component (A) are shown below, but not limited thereto. Notably, Me, Vi, and Ph in the formulae below designate methyl, vinyl, and phenyl, respectively.

[Chemical Formula 6]

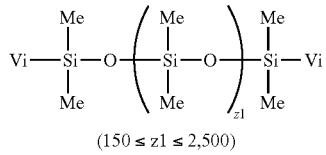

(150 ≤ z1 ≤ 2,500)

[Chemical Formula 8]

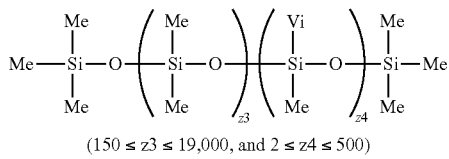

(150 ≤ z3 ≤ 19,000, and 2 ≤ z4 ≤ 500)

[Chemical Formula 7]

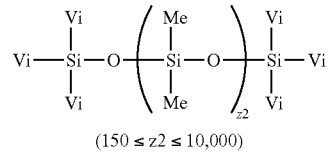

(150 ≤ z2 ≤ 10,000)

[Chemical Formula 9]

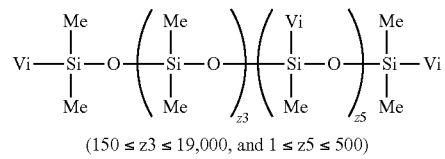

(150 ≤ z3 ≤ 19,000, and 1 ≤ z5 ≤ 500)

[Chemical Formula 10]

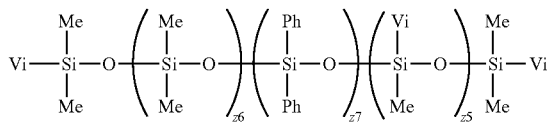

($1 \leq z6 \leq 19{,}000$, $1 \leq z7 \leq 500$, and $1 \leq z5 \leq 500$)

[Chemical Formula 11]

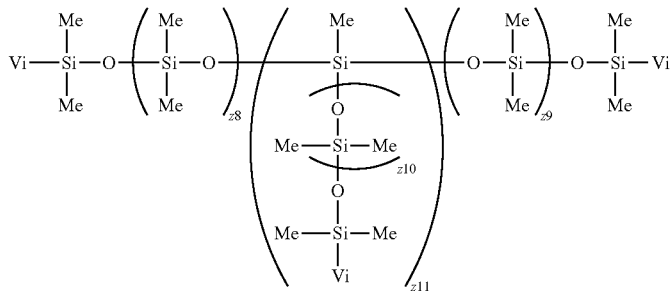

($0 \leq z8 \leq 5{,}000$, $0 \leq z9 \leq 5{,}000$, $0 \leq z10 \leq 500$, and $1 \leq z11 \leq 100$)

[Chemical Formula 12]

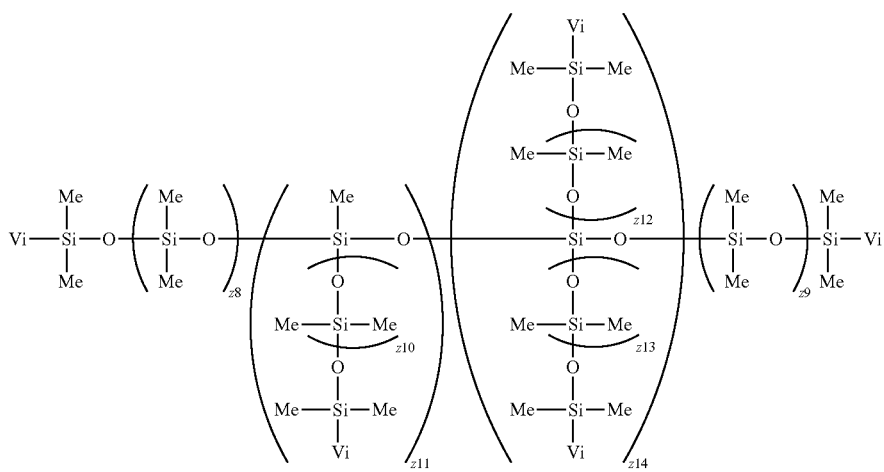

($0 \leq z8 \leq 5{,}000$, $0 \leq z9 \leq 5{,}000$, $0 \leq z10 \leq 500$, $0 \leq z11 \leq 100$, $0 \leq z12 \leq 500$, $0 \leq z13 \leq 500$, and $1 \leq z14 \leq 100$)

[(B): Adhesion Improving Component]

Component (B) used herein is an adhesion improving component which is a compound (B1) and/or a compound (B2).

Component (B1)

Component (B1) is a compound containing at least two alkenyl groups per molecule, having an alkenyl content corresponding to 5 to 1,000 times the alkenyl content of component (A), being free of epoxy groups, and having a viscosity at 25° C. of less than to 1 Pa·s or a 30 wt % toluene dilution viscosity of less than 0.1 Pa·s.

Component (B1) is formulated as the component which is effective for improving the curability of the composition and the substrate adhesion of a cured coating immediately after curing. The curability and substrate adhesion improving effects due to the addition of component (B1) are derived from substantial differences in viscosity and alkenyl content from component (A). Component (A) is a high viscosity organopolysiloxane which becomes a higher molecular weight one via slight crosslinking reaction. Accordingly, with the progress of reaction, the movement of molecules in the composition is restricted, leaving alkenyl groups and SiH groups unreacted. On the other hand, component (B1) has a higher alkenyl content and a lower viscosity than component (A). Accordingly, component (B1) undergoes little restriction of molecule movement in the composition and is highly reactive with SiH groups, contributing to an improvement in curability. Also residual SiH groups are reduced, leading to a low release force effect. It is further presumed that the progress of crosslinking reaction leads to a high crosslinking density whereby the substrate adhesion immediately after curing is improved.

Component (B1) contains at least two alkenyl groups per molecule. The alkenyl content of component (B1) corresponds to 5 to 1,000 times, preferably 10 to 500 times, more preferably 15 to 400 times the alkenyl content of component (A). An alkenyl content of less than 5 times fails to gain a substrate adhesion effect whereas an alkenyl content in excess of 1,000 times may lead to a high release force.

The alkenyl groups in component (B1) are preferably alkenyl groups of 2 to 12 carbon atoms, more preferably groups of the formula: —$(CH_2)_x$—CH=$CH_2$ wherein x is 0 or an integer of 1 to 10. Examples include vinyl, propenyl, butenyl, hexenyl, octenyl, and decenyl. The alkenyl group may contain an ether bond in its methylene chain, for example, —(CH$_2$)$_2$—O—CH$_2$—CH=CH$_2$ and —(CH$_2$)$_3$—O—CH$_2$—CH=CH$_2$.

Component (B1) preferably has a viscosity at 25° C. of less than 1 Pa·s or a 30 wt % toluene dilution viscosity of less than 0.1 Pa·s, more preferably a viscosity at 25° C. of less than 0.8 Pa·s or a 30 wt % toluene dilution viscosity of less than 0.08 Pa·s. With a viscosity of at least 1 Pa·s or a 30 wt % toluene dilution viscosity of at least 0.1 Pa·s, a substrate adhesion effect may not be obtained.

Component (B1) is preferably a hydrocarbon compound which has at least two alkenyl groups per molecule, may contain a hydroxyl group, and may be separated by an aryl group or an oxygen atom (e.g., ether bond, ester bond or the like), or an organopolysiloxane having the general formula (6).

[Chemical Formula 13]

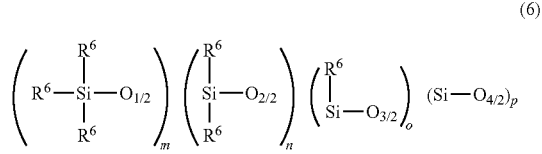

(6)

In formula (6), R$^6$ which may be identical or different is a substituted or unsubstituted C$_1$-C$_{20}$ monovalent hydrocarbon group free of aliphatic unsaturation, or a C$_2$-C$_{12}$ alkenyl group which may be separated by an oxygen atom, at least two of R$^6$ being alkenyl.

Exemplary of the C$_1$-C$_{20}$ monovalent hydrocarbon group free of aliphatic unsaturation are C$_1$-C$_{10}$ monovalent hydrocarbon groups including C$_1$-C$_6$ alkyl groups such as methyl, ethyl, propyl and butyl, C$_5$-C$_8$ cycloalkyl groups such as cyclohexyl, C$_6$-C$_{10}$ aryl groups such as phenyl and tolyl, C$_7$-C$_{10}$ aralkyl groups such as benzyl, or substituted forms of the foregoing in which one or more or even all of carbon-bonded hydrogen atoms are substituted by hydroxyl, cyano, halogen or the like, such as hydroxypropyl, cyanoethyl, 3-chloropropyl, and 3,3,3-trifluoropropyl. Especially from the standpoint of release properties, alkyl and aryl groups are preferred, with methyl, ethyl, propyl and phenyl being more preferred.

Examples of the C$_2$-C$_{12}$ alkenyl group which may be separated by an oxygen atom are as exemplified above for the C$_2$-C$_{12}$ alkenyl group. Inter alia, vinyl is preferred.

In formula (6), m, n, o and p are selected from positive numbers so as to meet a viscosity in the above range, specifically m is an integer of at least 2, preferably 2 to 100, n is an integer of at least 0, preferably 0 to 500, more preferably 0 to 300, even more preferably 0 to 140, o is an integer of at least 0, preferably 0 to 30, p is an integer of at least 0, preferably 0 to 30, $2 \leq m+n+o+p \leq 502$, preferably $2 \leq m+n+o+p \leq 300$, more preferably $2 \leq m+n+o+p \leq 150$.

The organopolysiloxane having formula (6) may be linear, branched or cyclic.

Examples of component (B1) are shown below, but not limited thereto. Notably, Me, Vi, and Ph in the formulae below designate methyl, vinyl, and phenyl, respectively.

[Chemical Formula 14]

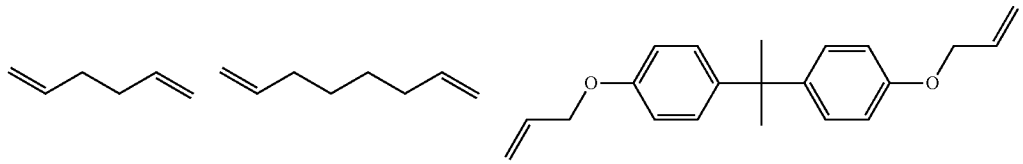

[Chemical Formula 15]

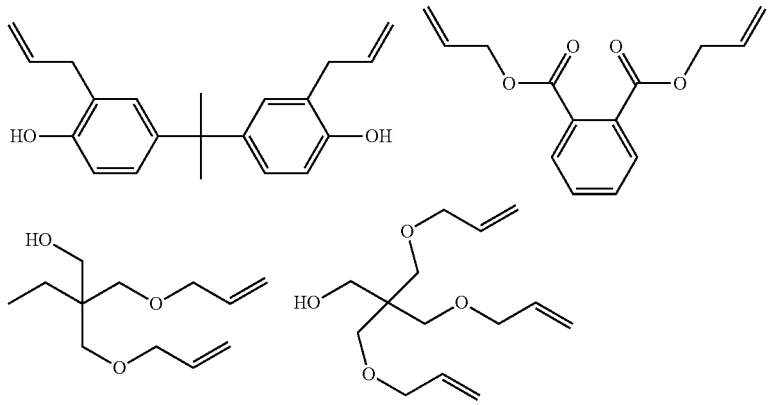

[Chemical Formula 16]

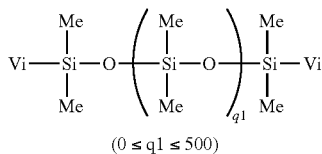

$(0 \leq q1 \leq 500)$

[Chemical Formula 17]

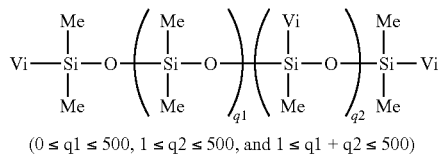

$(0 \leq q1 \leq 500, 1 \leq q2 \leq 500,$ and $1 \leq q1 + q2 \leq 500)$

-continued

[Chemical Formula 18]

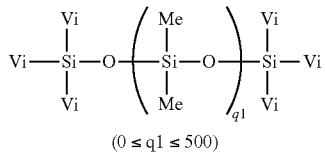

$(0 \leq q1 \leq 500)$

[Chemical Formula 19]

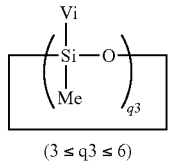

$(3 \leq q3 \leq 6)$

[Chemical Formula 20]

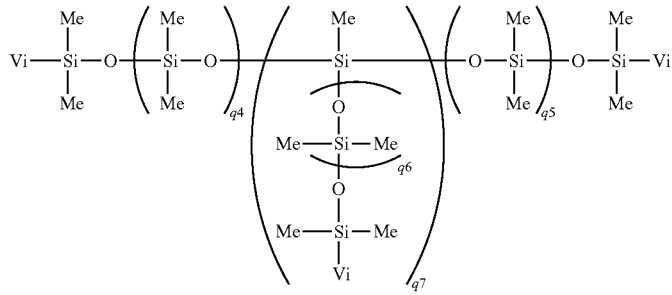

$(0 \leq q4 \leq 200, 0 \leq q5 \leq 200, 0 \leq q6 \leq 100, 1 \leq q7 \leq 30, \text{ and } 2 \leq q4 + q5 + ((q6 + 2) \times q7) \leq 500)$

[Chemical Formula 21]

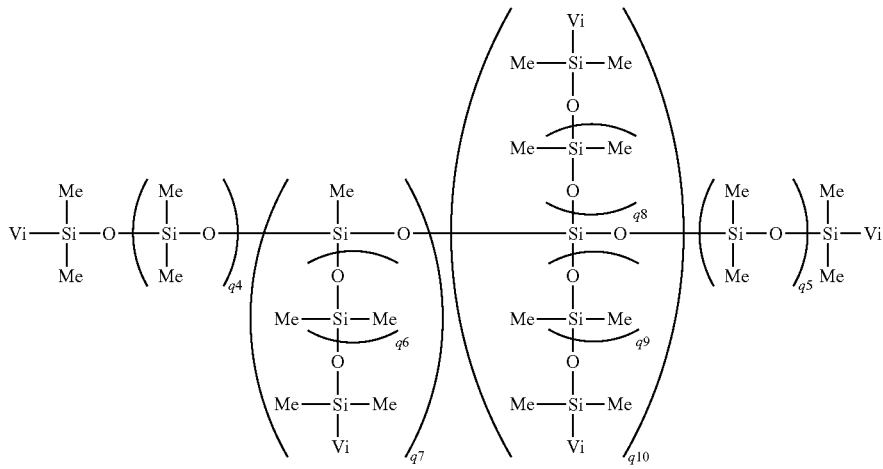

$(0 \leq q4 \leq 200, 0 \leq q5 \leq 200, 0 \leq q6 \leq 100, 0 \leq q7 \leq 30, 0 \leq q8 \leq 100, 0 \leq q9 \leq 100,$
$1 \leq q10 \leq 30, \text{ and } 3 \leq q4 + q5 + ((q6 + 2) \times q7) + ((q8 + q9 + 3) \times q10) \leq 500)$ When component (B1) is formulated, the amount of component (B1) is in a range of 0.1 to 30 parts by weight, preferably 0.1 to 20 parts by weight per 100 parts by weight of the organopolysiloxane as component (A). Less than 0.1 part by weight of component (B1) fails to improve substrate adhesion whereas more than 30 parts by weight of component (B1) leads to a high release force.

Component (B2)

Component (B2) is an organopolysiloxane containing at least 30 mol % per molecule of siloxane units having an epoxycyclohexyl group bonded to a silicon atom via a carbon atom, being free of alkenyl groups, and having an average degree of polymerization (DOP) of 2 to 50. Component (B2) is formulated as a component for maintaining the substrate adhesion of a cured coating under hot humid conditions. Notably, the average DOP is a weight average DOP as determined by gel permeation chromatography (GPC) versus polystyrene standards.

Component (B2) is an organopolysiloxane containing at least 30 mol % of siloxane units having an epoxycyclohexyl group bonded to a silicon atom via a carbon atom, preferably containing 40 to 100 mol % of siloxane units having an epoxycyclohexyl group bonded to a silicon atom via a carbon atom. If siloxane units are less than 30 mol %, a substrate adhesion effect is not obtained.

The organopolysiloxane as component (B2) should have an average DOP of 2 to 50, preferably 2 to 40. If the average DOP exceeds 50, a substrate adhesion effect is not obtained or workability is worsened.

The organopolysiloxane as component (B2) may be linear, branched or cyclic, or a mixture thereof. It is preferably an organopolysiloxane of linear or cyclic siloxane structure having the formula (1) or (2).

[Chemical Formula 22]

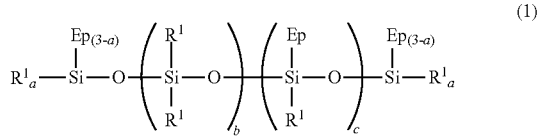

(1)

Herein Ep is a monovalent organic group having epoxycyclohexyl, $R^1$ which may be identical or different is a substituted or unsubstituted $C_1$-$C_{20}$ monovalent hydrocarbon group free of aliphatic unsaturation, hydrogen, hydroxyl, $C_1$-$C_{10}$ alkoxy group, or $C_4$-$C_{30}$ alkoxysilylalkyl group, a is an integer of 0 to 3, b is an integer of 0 to 33, preferably 0 to 23, c is an integer of 0 to 48, preferably 0 to 38, b+c is 0 to 48, preferably 0 to 38, with the proviso that c is at least 1 in case a=3, and a is less than 3 in case c=0, and are selected so as to satisfy that the organopolysiloxane contains at least 30 mol % of epoxycyclohexyl-containing siloxane units.

[Chemical Formula 23]

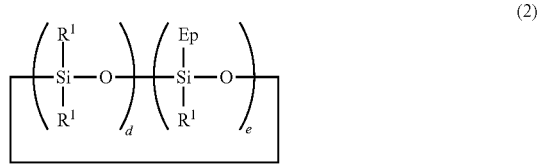

(2)

Herein Ep and $R^1$ are as defined above, d is an integer of 0 to 3, e is an integer of 1 to 6, d+e is 3 to 6, and are selected so as to satisfy that the organopolysiloxane contains at least 30 mol % of epoxycyclohexyl-containing siloxane units.

In formulae (1) and (2), Ep is a monovalent organic group having epoxycyclohexyl, which is preferably a group having epoxycyclohexyl bonded to a silicon atom via a carbon atom. Examples include 3,4-epoxycyclohexylmethyl, 2-(3,4-epoxycyclohexyl)ethyl, and 3-(3,4-epoxycyclohexyl)propyl, with 2-(3,4-epoxycyclohexyl)ethyl being preferred.

$R^1$ is a substituted or unsubstituted $C_1$-$C_{20}$, preferably $C_1$-$C_{18}$ monovalent hydrocarbon group free of aliphatic unsaturation, hydrogen atom, hydroxyl group, a $C_1$-$C_{10}$, preferably $C_1$-$C_8$ alkoxy group, or a $C_4$-$C_{30}$, preferably $C_4$-$C_{25}$ alkoxysilylalkyl group. Examples of the substituted or unsubstituted $C_1$-$C_{20}$ monovalent hydrocarbon group free of aliphatic unsaturation include alkyl groups such as methyl, ethyl, propyl and butyl, cycloalkyl groups such as cyclohexyl, aryl groups such as phenyl and tolyl, aralkyl groups such as benzyl and phenethyl, or substituted forms of the foregoing in which one or more or even all of carbon-bonded hydrogen atoms are substituted by hydroxyl, cyano, halogen or the like, such as hydroxypropyl, cyanoethyl, 3-chloropropyl, and 3,3,3-trifluoropropyl. Exemplary of the $C_1$-$C_{10}$ alkoxy group are methoxy, ethoxy, propoxy and butoxy. Exemplary of the $C_4$-$C_{30}$ alkoxysilylalkyl group are 2-(trimethoxysilyl)ethyl, 2-(triethoxysilyl)ethyl and 2-(tripropoxysilyl)ethyl. Of these groups, $R^1$ is preferably selected from hydrogen, alkyl, alkoxy and alkoxysilylalkyl groups, with $C_1$-$C_5$ alkyl groups being more preferred.

If component (B2) contains an alkenyl group in the molecule, curability degrades or a substrate adhesion effect is not obtained.

Component (B2) may be synthesized by any methods, for example, hydrolytic condensation of an epoxycyclohexyl-containing alkoxysilane alone or in admixture with another alkoxysilane, addition reaction (hydrosilylation reaction) of hydrogenpolysiloxane and 1,2-epoxy-4-vinylcyclohexane or the like in the presence of a catalyst such as a platinum compound, and equilibrium polymerization of an epoxycyclohexyl-containing organopolysiloxane in the presence of a basic catalyst. Of these, synthesis by addition reaction is preferred because the adjustment of molecular weight to the optimum range is easy.

Examples of component (B2) are shown below, but not limited thereto. Notably, Me, OMe, and $Ep^1$ in the formulae below designate methyl, methoxy, and 2-(3,4-epoxycyclohexyl)ethyl, respectively.

[Chemical Formula 24]

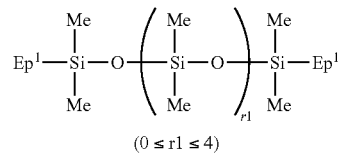

($0 \leq r1 \leq 4$)

[Chemical Formula 25]

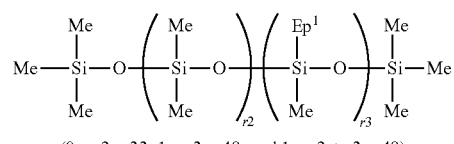

($0 \leq r2 \leq 33, 1 \leq r3 \leq 48,$ and $1 \leq r2 + r3 \leq 48$)

[Chemical Formula 26]

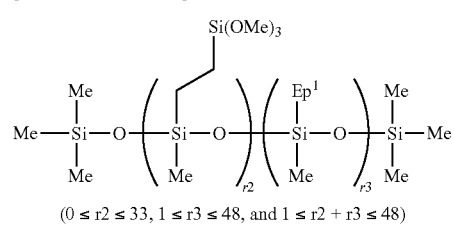

($0 \leq r2 \leq 33, 1 \leq r3 \leq 48,$ and $1 \leq r2 + r3 \leq 48$)

[Chemical Formula 27]

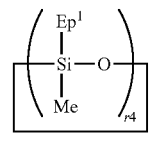

($3 \leq r4 \leq 6$)

[Chemical Formula 28]

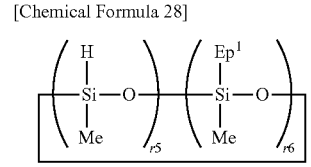

($1 \leq r5 \leq 3, 1 \leq r6 \leq 6,$ and $3 \leq r5 + r6 \leq 6$)

When component (B2) is formulated, the amount of component (B2) is in a range of 0.1 to 20 parts by weight, preferably 0.5 to 15 parts by weight per 100 parts by weight of the organopolysiloxane as component (A). Less than 0.1 part by weight of component (B2) fails to improve substrate adhesion whereas more than 20 parts by weight of component (B1) affects release properties or reduces the strength of a cured coating.

[(C): Organohydrogenpolysiloxane]

Component (C) is an organohydrogenpolysiloxane containing at least two silicon-bonded hydrogen atoms (also referred to as SiH groups, hereinafter) per molecule. Addition reaction takes place between SiH groups in component (C) and alkenyl groups in components (A) and (B1) to form a cured coating. Component (C) is typically represented by the average compositional formula (7).

In formula (7), $R^7$ which may be identical or different is a substituted or unsubstituted monovalent hydrocarbon group free of aliphatic unsaturation. Examples include alkyl groups, preferably of 1 to 6 carbon atoms such as methyl, ethyl, propyl and butyl, cycloalkyl groups, preferably of 5 to 8 carbon atoms such as cyclohexyl, aryl groups, preferably of 6 to 10 carbon atoms such as phenyl and tolyl, aralkyl groups, preferably of 7 to 10 carbon atoms such as benzyl, or substituted forms of the foregoing in which one or more or even all of carbon-bonded hydrogen atoms are substituted by hydroxyl, cyano, halogen or the like, such as hydroxypropyl, cyanoethyl, 3-chloropropyl, and 3,3,3-trifluoropropyl. Inter alia, alkyl and aryl groups are preferred, and methyl is more preferred from the standpoint of increased addition reaction rate.

The subscript s is a positive number of 0.1 to 2, preferably 0.2 to 1.5, t is a positive number of 0.1 to 3, preferably 0.2 to 2, and s+t is up to 3.1, especially 0.5 to 2.7.

Examples of the organohydrogenpolysiloxane having formula (7) include polymers or copolymers comprising units of at least one type selected from $R^7HSiO_{2/2}$ units, $HSiO_{3/2}$ units, and $R^7_2HSiO_{1/2}$ units wherein $R^7$ is as defined above, and optionally units of at least one type selected from $R^7_2SiO_{2/2}$ units, $R^7SiO_{3/2}$ units, and $R^7_3SiO_{1/2}$ units, and preferably polymers containing per molecule at least 2, more preferably 10 to 100 $R^7HSiO_{2/2}$ units or $R^7_2HSiO_{1/2}$ units in total. These polymers may further contain $SiO_{4/2}$ units as long as the benefits of the invention are obtainable.

It is noted that the content of SiH groups is preferably 0.1 to 3 moles/100 g, especially 0.2 to 2 moles/100 g of the organopolysiloxane.

The organohydrogenpolysiloxane may be linear, branched or cyclic, or a mixture thereof.

Component (C) preferably has a viscosity at 25° C. of 0.001 to 10 Pa·s, more preferably 0.005 to 5 Pa·s. Too low a viscosity may lead to low curability whereas too high a viscosity may lead to poor workability.

Examples of component (C) are shown below, but not limited thereto. Notably, Me and Ph in the formulae below designate methyl and phenyl, respectively.

[Chemical Formula 29]

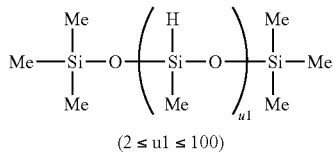

($2 \le u1 \le 100$)

[Chemical Formula 30]

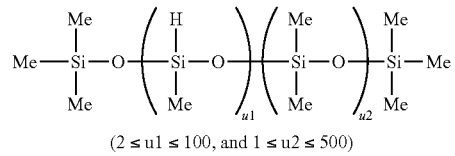

($2 \le u1 \le 100$, and $1 \le u2 \le 500$)

[Chemical Formula 31]

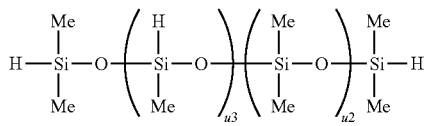

($0 \le u3 \le 98$, and $1 \le u2 \le 500$)

[Chemical Formula 32]

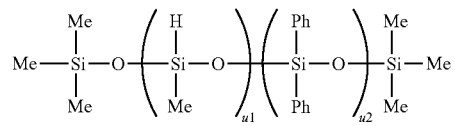

($2 \le u1 \le 100$, and $1 \le u2 \le 500$)

[Chemical Formula 33]

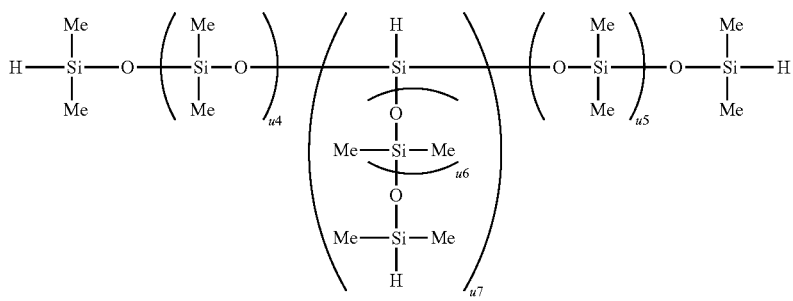

($0 \le u4 \le 200$, $0 \le u5 \le 200$, $0 \le u6 \le 100$, and $1 \le u7 \le 49$)

Component (C) is formulated in such an amount that the moles of silicon-bonded hydrogen atoms in component (C) corresponds to 0.5 to 10 times, preferably 1 to 5 times the moles of alkenyl groups in components (A) and (B1). If the molar ratio is less than 0.5, curability is low and substrate adhesion is worsened. If the molar ratio is more than 10, the release force becomes high. Also, when component (B2) has silicon-bonded hydrogen, the moles of silicon-bonded hydrogen in components (C) and (B2) is preferably 0.5 to 10 times, more preferably 1 to 5 times the moles of alkenyl groups in components (A) and (B1).

Further, from the standpoint of an appropriate crosslinking density, the amount of component (C) blended is preferably 0.1 to 30 parts by weight, more preferably 0.5 to 15 parts by weight, even more preferably 0.5 to 10 parts by weight per 100 parts by weight of component (A).

[(D): Platinum Group Metal Base Catalyst]

Component (D) is a platinum group metal base catalyst which promotes addition reaction between components (A)

and (B1) and component (C). Any of catalysts which are well-known to the skilled artisan as promoting hydrosilylation reaction may be used. Suitable platinum group metal base catalysts include platinum, palladium, rhodium and ruthenium base compounds. Of these, platinum base catalysts are preferably used. Suitable platinum base catalysts include, for example, chloroplatinic acid, alcohol or aldehyde solutions of chloroplatinic acid, and complexes of chloroplatinic acid with olefins or vinylsiloxanes.

The amount of component (D) used is a catalytic amount. It is preferred for forming a satisfactory cured coating to blend the catalyst in an amount to give 10 to 1,000 ppm, preferably 20 to 500 ppm (on weight basis) of platinum group metal based on the weight of component (A).

[(E): Organic Solvent or Water for Dilution]

The silicone composition of the invention may contain an organic solvent or water for dilution as an optional component.

Although the silicone composition of the invention may be a solventless composition obtained by combining predetermined amounts of components (A) to (D) defined above, it may also be used as an emulsion composition after dilution with water or a solvent composition after dilution with an organic solvent. By diluting with the organic solvent or water, there are obtained advantages in practical application including an improvement in coating work, and improvements in coating states such as thickness and surface finish of a coating.

Examples of the organic solvent which can be used herein include aromatic hydrocarbon compounds such as toluene and xylene, aliphatic hydrocarbon compounds such as hexane, heptane, and isoparaffin, ketone compounds such as acetone, methyl ethyl ketone and methyl isobutyl ketone, ester compounds such as ethyl acetate and butyl acetate, and ether compounds such as diisopropyl ether and 1,4-dioxane. Any of the compounds in which the silicone is dissolved may be used.

When component (E) is used, the amount of component (E) is preferably 100 to to 20,000 parts by weight, more preferably 200 to 10,000 parts by weight per 100 parts by weight of component (A). Less than 100 parts of component (E) may fail to gain advantages associated with dilution whereas more than 20,000 parts may achieve little further improvements in the above-described effects.

[(F): Release Force Controlling Component Containing Acrylic-Silicone Graft Copolymer]

Component (F) is a release force controlling component comprising an acrylic-silicone graft copolymer. Formulation of component (F) enables to provide a very low release force and to form a release coating that ensures a high percent residual adhesion of a PSA sheet which is peeled therefrom.

The acrylic-silicone graft copolymer used herein is a copolymer obtained from radical polymerization of (a) an organopolysiloxane compound having an acrylic and/or methacrylic group (also referred to as (meth)acrylic group, hereinafter) and (b) a radically polymerizable monomer having one radically polymerizable group per molecule, the graft copolymer having a weight average molecular weight of 1,000 to 100,000.

The copolymer has a Mw of 1,000 to 100,000, preferably 1,500 to 50,000, more preferably 2,000 to 30,000, as measured versus polystyrene standards by gel permeation chromatography (GPC) using toluene as developing solvent. With a Mw of less than 1,000, the percent residual adhesion lowers. With a Mw in excess of 100,000, the dispersion of a copolymer in the silicone composition is degraded.

[(a): Organopolysiloxane Compound Having (Meth)Acrylic Group]

The organopolysiloxane compound (a) used herein is not particularly limited as long as it has a (meth)acrylic group. From the standpoints including ease of copolymerization with (b) a radically polymerizable monomer having one radically polymerizable group per molecule, ease of synthesis of the organopolysiloxane compound itself, and the effect of the release force controlling component, a radically polymerizable silicone macromonomer having the general formula (3) is preferred.

[Chemical Formula 34]

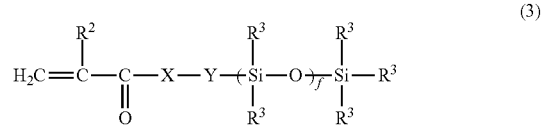

(3)

In formula (3), $R^2$ is hydrogen or methyl, X is a divalent functional group selected from an oxygen atom, NH group and sulfur atom.

Y is a $C_1$-$C_{12}$, preferably $C_1$-$C_{10}$ divalent hydrocarbon group which may be separated by an oxygen atom. Examples include alkylene groups such as methylene, ethylene, propylene (trimethylene or methylethylene), butylene (tetramethylene or methylpropylene), hexamethylene, and octamethylene; arylene groups such as phenylene; and combinations of two or more of the foregoing groups (alkylene-arylene groups), —CH$_2$CH$_2$—O—CH$_2$CH$_2$—, —CH$_2$CH$_2$—O—CH$_2$CH$_2$—O—CH$_2$CH$_2$—, —CH(CH$_3$)CH$_2$—O—CH(CH$_3$)CH$_2$—, and —CH$_2$CH$_2$CH$_2$CH$_2$—O—CH$_2$CH$_2$CH$_2$CH$_2$—. Y is preferably ethylene, propylene or butylene.

The subscript f is an integer of 0 to 1,000, preferably 0 to 500, more preferably 0 to 200.

$R^3$ which may be identical or different is a substituted or unsubstituted $C_1$-$C_{20}$, preferably $C_1$-$C_{18}$ monovalent hydrocarbon group, hydrogen, hydroxyl, $C_1$-$C_{10}$, preferably $C_1$-$C_8$ alkoxy group or substituent group having the general formula (4).

[Chemical Formula 35]

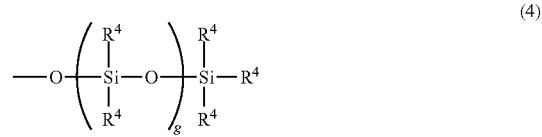

(4)

Herein $R^4$ which may be identical or different is a substituted or unsubstituted $C_1$-$C_{20}$, preferably $C_1$-$C_{18}$ monovalent hydrocarbon group, hydrogen atom, hydroxyl group, or a $C_1$-$C_{10}$, preferably $C_1$-$C_8$ alkoxy group, and g is an integer of 0 to 300.

Herein $R^3$ and $R^4$ each are a substituted or unsubstituted $C_1$-$C_{20}$ monovalent hydrocarbon group. Examples include alkyl groups such as methyl, ethyl, propyl and butyl, cycloalkyl groups such as cyclohexyl, aryl groups such as phenyl and tolyl, aralkyl groups such as benzyl and phenethyl, or substituted forms of the foregoing in which one or more or even all of carbon-bonded hydrogen atoms are substituted by hydroxyl, cyano, halogen or the like, such as hydroxypropyl, cyanoethyl, 3-chloropropyl, and 3,3,3-trifluoropropyl. Examples of the $C_1$-$C_{10}$ alkoxy group include methoxy, ethoxy, propoxy and butoxy. $R^3$ is preferably an alkyl or aryl group, more preferably $C_1$-$C_5$ alkyl group. $R^4$ is preferably an alkyl or aryl group, more preferably $C_1$-$C_5$ alkyl group.

The subscript g is an integer of 0 to 300, preferably 0 to 100, more preferably 0 to 50.

Examples of component (a) are shown below, but not limited thereto. Notably, Me, OMe, and Ph in the formulae below designate methyl, methoxy, and phenyl, respectively.

[Chemical Formula 36]

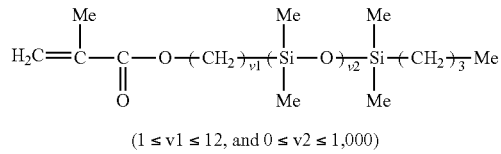

(1 ≤ v1 ≤ 12, and 0 ≤ v2 ≤ 1,000)

[Chemical Formula 37]

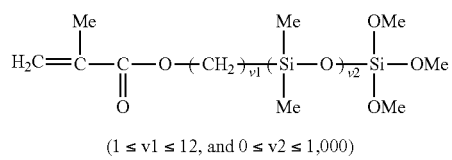

(1 ≤ v1 ≤ 12, and 0 ≤ v2 ≤ 1,000)

[Chemical Formula 38]

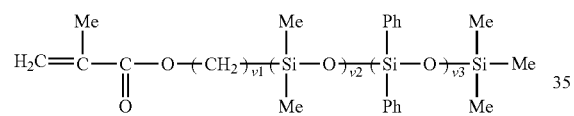

(1 ≤ v1 ≤ 12, 0 ≤ v2 ≤ 1,000, 0 ≤ v3 ≤ 1,000, and 0 ≤ v2 + v3 ≤ 1,000)

[Chemical Formula 39]

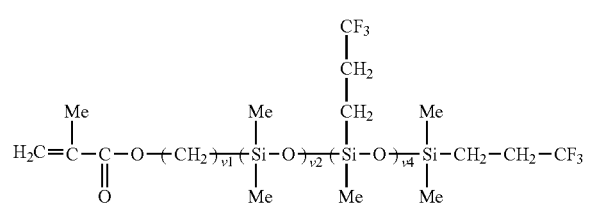

(1 ≤ v1 ≤ 12, 0 ≤ v2 ≤ 1,000, 0 ≤ v4 ≤ 1,000, and 0 ≤ v2 + v4 ≤ 1,000)

[Chemical Formula 40]

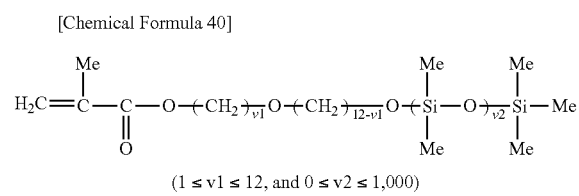

(1 ≤ v1 ≤ 12, and 0 ≤ v2 ≤ 1,000)

[Chemical Formula 41]

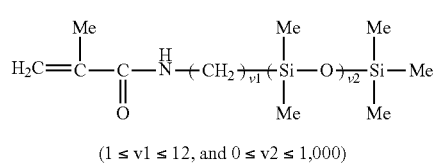

(1 ≤ v1 ≤ 12, and 0 ≤ v2 ≤ 1,000)

[Chemical Formula 42]

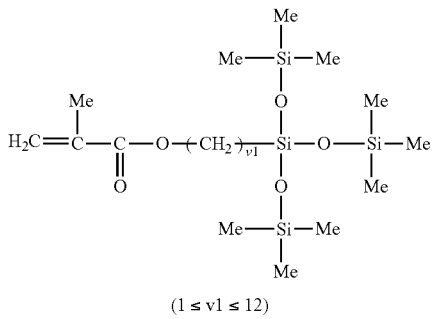

(1 ≤ v1 ≤ 12)

[Chemical Formula 43]

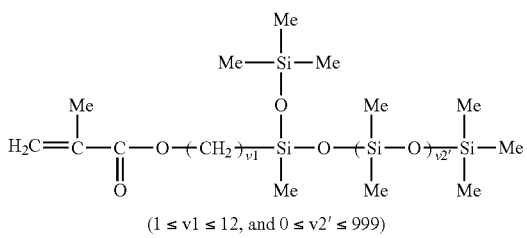

(1 ≤ v1 ≤ 12, and 0 ≤ v2' ≤ 999)

[Chemical Formula 44]

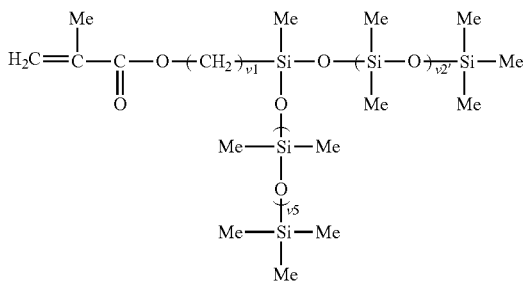

(1 ≤ v1 ≤ 12, 1 ≤ v2' ≤ 999, and 0 ≤ v5 ≤ 300)

[(b): Radically Polymerizable Monomer]

The radically polymerizable monomer (b) may be used alone or in admixture and is not particularly limited as long as it is a compound having one radically polymerizable group per molecule.

Typically component (b) is a compound having per molecule one radically polymerizable group such as acrylic, methacrylic, styryl, silicate, vinyl or allyl. Examples include (meth)acrylates such as methyl (meth)acrylate, ethyl (meth)acrylate, n-butyl (meth)acrylate, 2-ethylhexyl (meth)acrylate, lauryl (meth)acrylate, stearyl (meth)acrylate, cyclohexyl (meth)acrylate, benzyl (meth)acrylate, isobornyl (meth)acrylate, trifluoropropyl (meth)acrylate, perfluorobutylethyl (meth)acrylate, and perfluorooctylethyl (meth) acrylate; epoxy-containing radically polymerizable monomers such as glycidyl (meth)acrylate, β-methylglycidyl (meth)acrylate and 3,4-epoxycyclohexylmethyl (meth)acrylate; hydroxyl-containing radically polymerizable monomers such as 2-hydroxyethyl (meth)acrylate, 2-hydroxypropyl (meth)acrylate and 2-hydroxybutyl (meth)acrylate; radically polymerizable silane compounds such as γ-methacryloxypropyltrimethoxysilane, γ-methacryloxypropylmethyldimethoxysilane, γ-methacryloxypropyldimethylmethoxysilane, γ-methacryloxypropyltriethoxysilane, γ-methacryloxypropylmethyldiethoxysilane, γ-methacryloxypropyltributoxysilane, γ-methacryloxypropyltriisopropenoxysilane, γ-acryloxypropyltrimethoxysilane, acryloxymethyltrimethoxysilane, γ-acryloxypropyltriethoxysilane, γ-acryloxypropylmethyldiethoxysilane, styryltrimethoxysilane, styryltriethoxysilane, and α-methylstyryltrimethoxysilane; polyoxyalkylene-containing radically polymerizable monomers; and glycerol (meth)acrylate.

With the low release force effect and high residual adhesion effect attributable to the release force controlling component taken into account, $C_1$-$C_{30}$ alkyl (meth)acrylates are preferably incorporated, more preferably methyl (meth)acrylate being incorporated.

[Component (a)/Component (b) Ratio]

A weight ratio [(a)/(b)] of (a) the organopolysiloxane compound having a (meth)acrylic group to (b) the radically polymerizable monomer having one radically polymerizable group per molecule is preferably in the range of 30/70 to 99/1, more preferably from 40/60 to 97/3, even more preferably from 50/50 to 95/5. If the weight ratio [(a)/(b)] is less than 30/70, which means a less content of silicone component, the release force controlling component is less compatible in the silicone composition and may separate out. If the weight ratio [(a)/(b)] exceeds 99/1, the low release force effect may be reduced.

[Method for Synthesizing Acrylic-Silicone Graft Copolymer]

Copolymerization of monomer reactants including (a) the organopolysiloxane compound having a (meth)acrylic group and (b) the radically polymerizable monomer having one radically polymerizable group per molecule may be performed in the presence of a conventional radical polymerization initiator, which is selected from among peroxides such as benzoyl peroxide, dicumyl peroxide, lauroyl peroxide, and tert-butyl 2-ethylperoxyhexanoate, and azo compounds such as 2,2'-azobis(2-methylbutyronitrile). Any of solution polymerization, emulsion polymerization, suspension polymerization, and bulk polymerization may be applied.

In the practice of the invention, the solution polymerization is preferred among these polymerization methods because it is easy to adjust the molecular weight of the resulting acrylic-silicone graft copolymer to an optimum range. Examples of the solvent used in the solution polymerization include aromatic hydrocarbons such as benzene, toluene and xylene, ketones such as acetone, methyl ethyl ketone and methyl isobutyl ketone, esters such as ethyl acetate, n-butyl acetate, and isobutyl acetate, and alcohols such as ethanol, isopropanol, n-butanol and isobutanol, and mixtures thereof.

The polymerization temperature is preferably in a range of 50 to 180° C., especially 60 to 120° C. Under this temperature condition, polymerization reaction may be completed within about 1 to about 10 hours. The method of recovering the copolymer from the copolymerization solution is not particularly limited. Exemplary are a method of evaporating the solvent, and a method of adding a poor solvent (e.g., water or methanol) to the copolymerization solution, letting the copolymer precipitate, and drying.

When component (F) is formulated, the amount of component (F) is preferably 0.1 to 20 parts by weight, more preferably 0.1 to 15 parts by weight per 100 parts by weight of component (A). Too less an amount of component (F) may lessen the low release force effect whereas an excessive amount may detract from curability.

[Other Optional Components]

While the silicone composition of the invention is obtained by mixing predetermined amounts of components (A) to (D) defined above, another component may be added if necessary insofar as the objects and benefits of the invention are not impaired. Any of well-known components commonly used in silicone base release agent compositions may be added in an ordinary amount.

Of the other optional components, for example, organonitrogen compounds, organophosphorus compounds, acetylene compounds, oxime compounds, and organic chloro compounds may be used as the pot-life prolonging agent. Examples include acetylene alcohols such as 3-methyl-1-butyn-3-ol, 3,5-dimethyl-1-hexyn-3-ol, 3-methyl-1-penten-3-ol, and phenylbutynol, acetylene compounds such as 3-methyl-3-1-penten-1-yne and 3,5-dimethyl-1-hexyn-3-yne, the reaction products of these acetylene compounds with alkoxysilanes or siloxanes, or hydrogensilanes, vinylsiloxanes such as cyclic tetramethylvinylsiloxane, organonitrogen compounds such as benzotriazole, other organophosphorus compounds, oxime compounds, and organic chloro compounds.

When any of these compounds is formulated, it may be used in an amount sufficient to provide a satisfactory pot life, preferably 0.01 to 10 parts by weight, more preferably 0.05 to 5 parts by weight per 100 parts by weight of component (A).

When the inventive composition is prepared as an emulsion composition, a surfactant or high molecular weight emulsifier may be blended, typically in an amount of 0.1 to 10 parts by weight per 100 parts by weight of component (A).

Furthermore, any of well-known antioxidants, pigments, stabilizers, antistatic agents, defoamers, adhesion improvers other than component (B), thickeners and inorganic fillers (e.g., silica) may be added as the optional component as long as the benefits of the invention are not compromised.

For the preparation of the release paper or film-forming silicone composition, the method involving the steps of previously mixing components (A) to (C) and optional components until uniform, and adding component (D) immediately before use is desirable in view of pot life.

[Coated Article]

The release paper or film-forming silicone composition as such or after dilution with the above-mentioned diluent solvent or water to the above-defined range, may be applied to one surface or both surfaces of a sheet-like substrate such as paper or film by means of a comma coater, lip coater, roll coater, die coater, knife coater, blade coater, rod coater, kiss coater, gravure coater, wire bar coater or the like, or by a coating technique such as screen coating, dip coating, cast coating or the like, in a coating weight of 0.01 to 100 g/m$^2$, and heated at 50 to 200° C. for 1 to 120 seconds to form a cured coating on the substrate. Where release layers are formed on both surfaces of a substrate, preferably the step of forming a cured coating on a substrate surface is performed on each of the substrate surfaces.

Examples of the substrate include coated paper sheets such as polyethylene laminated paper, glassine paper, wood-free paper, kraft paper, and clay coated paper, synthetic paper sheets such as Yupo, polyethylene film, polypropylene film such as CPP and OPP, polyester film such as polyethylene terephthalate (PET) film, polyamide film, polyimide film, polylactate film, polyphenol film, and polycarbonate film. The substrate which has been subjected on its surface to corona treatment, etching treatment or plasma treatment may also be used in order to enhance the adhesion between the substrate and the release layer.

EXAMPLE

Synthesis Examples, Examples and Comparative Examples are given below although the invention is not limited thereto. In Examples, all parts are parts by weight (pbw).

Preparation of Silicone Composition and Release Film
<Starting Materials>
Component (A)

(A-1) organopolysiloxane consisting of 0.04 mol % of trivinylsiloxane units: $(CH_2=CH)_3SiO_{1/2}$, 0.4 mol % of methylvinylsiloxane units: $(CH_3)(CH_2=CH)SiO_{2/2}$, and 99.56 mol % of dimethylsiloxane units: $(CH_3)_2SiO_{2/2}$.
30 wt % toluene dilution viscosity at 25° C.=15 Pa·s
alkenyl content=0.01 mol/100 g (A-2) organopolysiloxane consisting of 0.02 mol % of dimethylvinylsiloxane units: $(CH_3)_2(CH_2=CH)SiO_{1/2}$, 3.4 mol % of methylvinylsiloxane units: $(CH_3)(CH_2=CH)SiO_{2/2}$, and 96.58 mol % of dimethylsiloxane units: $(CH_3)_2SiO_{2/2}$.
30 wt % toluene dilution viscosity at 25° C.=10 Pa·s
alkenyl content=0.04 mol/100 g Component (B)

(B1-1) organopolysiloxane consisting of 50 mol % of $(CH_3)_2(CH_2=CH)SiO_{1/2}$ units and 50 mol % of $(CH_3)SiO_{3/2}$ units.
viscosity at 25° C.=0.1 Pa·s
alkenyl content=0.55 mol/100 g (B1-2) organopolysiloxane consisting of 10 mol % of dimethylvinylsiloxane units: $(CH_3)_2(CH_2=CH)SiO_{1/2}$ and 90 mol % of dimethylsiloxane units: $(CH_3)_2SiO_{2/2}$.
viscosity at 25° C.=0.01 Pa·s
alkenyl content=0.25 mol/100 g (B1-3) organopolysiloxane consisting of 4 mol % of dimethylvinylsiloxane units: $(CH_3)_2(CH_2=CH)SiO_{1/2}$ and 96 mol % of dimethylsiloxane units: $(CH_3)_2SiO_{2/2}$.
viscosity at 25° C.=0.1 Pa·s
alkenyl content=0.06 mol/100 g (B1-4) organopolysiloxane consisting of 1.5 mol % of dimethylvinylsiloxane units: $(CH_3)_2(CH_2=CH)SiO_{1/2}$, 12.8 mol % of methylvinylsiloxane units: $(CH_3)(CH_2=CH)SiO_{2/2}$, and 85.7 mol % of dimethylsiloxane units: $(CH_3)_2SiO_{2/2}$.
viscosity at 25° C.=0.3 Pa·s
alkenyl content=0.2 mol/100 g (B1-5)

[Chemical Formula 45]

alkenyl content = 1.3 mol/100 g (B1-6)

[Chemical Formula 46]

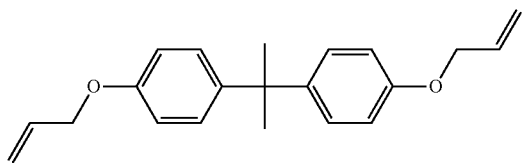

alkenyl = 0.7 mol/100 g (B1-7) organopolysiloxane consisting of 1.4 mol % of dimethylvinylsiloxane units: $(CH_3)_2(CH_2=CH)SiO_{1/2}$ and 98.6 mol % of dimethylsiloxane units: $(CH_3)_2SiO_{2/2}$.
viscosity at 25° C.=0.4 Pa·s
alkenyl content=0.02 mol/100 g (B2-1) organopolysiloxane of the formula below.

[Chemical Formula 47]

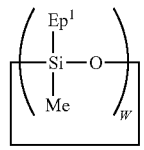

(w=4, $Ep^1$=2-(3,4-epoxycyclohexyl)ethyl, Me=methyl)

(B2-2) organopolysiloxane of the formula below.

[Chemical Formula 48]

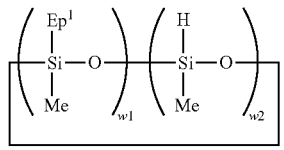

(w1 = 3, w2 = 1, $Ep^1$ = 2-(3,4-epoxycyclohexyl)ethyl, Me = methyl)

(B2-3) organopolysiloxane of the formula below.

[Chemical Formula 49]

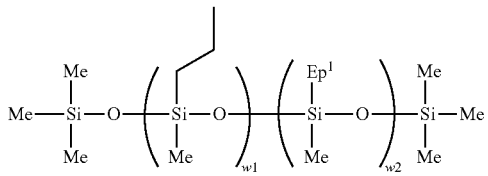

(w1 = 15, w2 = 15, $Ep^1$ = 2-(3,4-epoxycyclohexyl)ethyl, Me = methyl)

(B2-4) organopolysiloxane of the formula below.

[Chemical Formula 50]

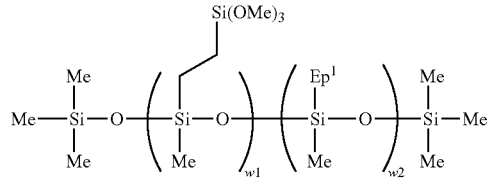

(w1 = 2, w2 = 6, $Ep^1$ = 2-(3,4-epoxycyclohexyl)ethyl, Me = methyl, OMe = methoxy)

(B2-5) organopolysiloxane of the formula below.

[Chemical Formula 51]

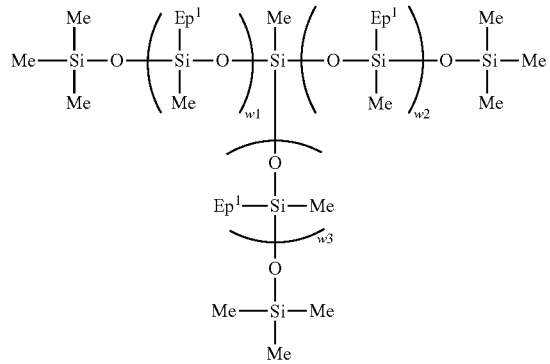

(w1 = 3, w2 = 3, w3 = 3, Ep¹ = 2-(3,4-epoxycyclohexyl)ethyl, Me = methyl)

(B2-6) organopolysiloxane of the formula below.

[Chemical Formula 52]

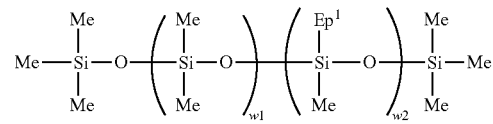

(w1 = 42, w2 = 33, Ep¹ = 2-(3,4-epoxycyclohexyl)ethyl, Me = methyl)

(B2-7) organopolysiloxane of the formula below.

[Chemical Formula 53]

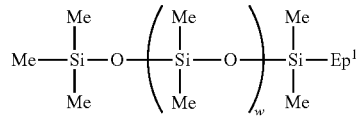

(w = 20, Ep¹ = 2-(3,4-epoxycyclohexyl)ethyl, Me = methyl)

(B2-8) epoxy-containing organopolysiloxane obtained by reacting 43 wt % of an organopolysiloxane consisting of 20 mol % of silanol-terminated siloxane units: $(CH_3)_2(OH)SiO_{1/2}$, 40 mol % of methylvinylsiloxane units: $(CH_3)(CH_2=CH)SiO_{2/2}$, and 40 mol % of dimethylsiloxane units: $(CH_3)_2SiO_{2/2}$ and having a viscosity at 25° C. of 20 mm²/s with 57 wt % of 2-(3,4-epoxycyclohexyl)ethyltrimethoxysilane in the presence of potassium siliconate at 100° C. for 1 hour.

viscosity at 25° C.=0.6 Pa·s
alkenyl content=0.20 mol/100 g
average DOP=20
siloxane units having epoxycyclohexyl bonded to silicon via carbon=40 mol %

(B2-9) organopolysiloxane of the formula below.

[Chemical Formula 54]

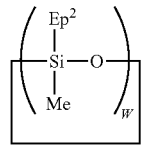

(w = 4, Ep² = 3-glycidoxypropyl, Me = methyl)

(B2-10) epoxy-containing siloxane oligomer obtained from partial hydrolytic condensation of 99.98 wt % of 3-glycidoxypropyltriethoxysilane with 0.02 wt % of water in the presence of hydrochloric acid at 100° C. for 5 hours.
viscosity at 25° C.=0.01 Pa·s
average DOP=3
siloxane units having epoxy bonded to silicon via carbon=100 mol %

Component (C)
(C-1) organohydrogenpolysiloxane consisting of 2 mol % of trimethylsiloxane units: $(CH_3)_3SiO_{1/2}$, 68 mol % of methylhydrogensiloxane units: $(CH_3)HSiO_{2/2}$, and 30 mol % of dimethylsiloxane units: $(CH_3)_2SiO_{2/2}$.
viscosity at 25° C.=0.1 Pa·s
SiH content=1.1 mol/100 g (C-2) organohydrogenpolysiloxane consisting of 5 mol % of trimethylsiloxane units: $(CH_3)_3SiO_{1/2}$ and 95 mol % of methylhydrogensiloxane units: $(CH_3)HSiO_{2/2}$.
viscosity at 25° C.=0.02 Pa·s
SiH content=1.5 mol/100 g Component (D)
platinum-vinyl siloxane complex as catalyst Component (E)
solvent mixture of toluene and hexane in a weight ratio of 1:1

Component (F)
(F-1) release force-controlling component: acrylic-silicone graft copolymer obtained in Synthesis Example 1

Synthesis Example 1

A glass reactor equipped with a stirrer, thermometer, reflux condenser and dropping funnel was charged with 30.0 parts of toluene and heated at 90-100° C. Under nitrogen stream, a mixture of 55.7 parts (0.067 mol) of a radically polymerizable silicone macromonomer having the formula (8), 9.8 parts (0.098 mol) of methyl methacrylate, 2.5 parts (0.012 mol) of tert-butyl 2-ethylperoxyhexanoate, and 51.8 parts of toluene was added dropwise to the reactor over 4 hours. After polymerization at 90-100° C. for 2 hours, 0.4 part (0.002 mol) of tert-butyl 2-ethylperoxyhexanoate was added, and polymerization continued for 2 hours. The reaction solution was then dried in a vacuum dryer under conditions of 150° C./10 mmHg, yielding an acrylic-silicone graft copolymer. It had a Mw of 12,000 as measured by GPC versus polystyrene standards.

[Chemical Formula 55]

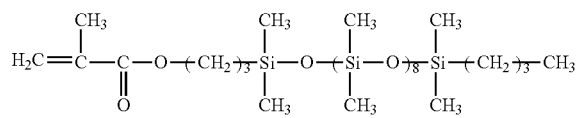

(8)

Component (G)
  pot-life prolonging agent: 3-methyl-1-butyn-3-ol

Examples 1 to 15 and Comparative Examples 1 to 8

A coating composition was prepared by the following procedure using the foregoing components (A) to (E) and (G) as starting materials.

Components (A) to (C) were fed into a flask in accordance with the formulation in Table 1, 3,200 parts of component (E) and 3 parts of component (G) were added thereto, and the contents were stirred and dissolved. Component (D) was added to the solution in an amount to give 100 ppm of platinum based on the weight of component (A). The solution was stirred and mixed, yielding the coating composition. Using the coating composition, a coated article was prepared and evaluated by the procedures described below.

<Evaluation>

[Curability (Adhesion Immediately after Curing)]

The composition was coated to a PET film of 38 μm thick by means of a bar coater in a coating weight of 0.1 g/m² as solids and heated in a hot air dryer at 100° C. for a predetermined time (second) to form a release agent layer. The release agent layer was rubbed with the finger 10 strokes, after which it was visually observed for smear and rub-off and evaluated according to the following criterion.

A: no smear or rub-off at time of 30 seconds
B: smear and rub-off at time of 30 seconds, but not at 40 seconds
C: smear and rub-off at time of 40 seconds, but not at 50 seconds
D: smear and rub-off at time of 50 seconds

[Release Force]

The composition was coated to a PET film of 38 μm thick by means of a bar coater in a coating weight of 0.1 g/m² as solids and heated in a hot air dryer at 120° C. for 40 seconds to form a release agent layer. Evaluation was made by the following procedure according to the FINAT test method.

A PSA tape of 25 mm wide (Tesa 7475 tape by Tesa Tape Inc.) was rested on the surface of the release agent layer. With a load of 20 g/cm² rested on the PSA tape, the assembly was heat treated in a dryer at 70° C. for 20 hours. The assembly was cooled in air for 30 minutes. Using a tensile tester (DSC-500 model tester by Shimadzu Corp.), a release force (N/25 mm) was measured by peeling the Tesa 7475 tape from the release agent layer at an angle of 180° and a peel rate of 0.3 m/min.

[Residual Adhesion]

A release agent layer was formed as in the above release force test. A polyester PSA tape of 25 mm wide (Nitto 31B by Nitto Denko Corp.) was rested on the surface of the release agent layer. With a load of 20 g/cm² rested on the PSA tape, the assembly was heat treated in a dryer at 70° C. for 20 hours. Thereafter, the polyester PSA tape was peeled from the release agent layer and in turn, attached to a stainless steel plate. Next, using a tensile tester, a release force F required to peel the polyester PSA tape from the steel plate was measured.

Also, a polyester PSA tape was bonded to a tetrafluoroethylene plate instead of the release agent layer and similarly treated, after which a release force $F_0$ was measured.

A percent residual adhesion was computed from the formula:

(release force $F$/release force $F_0$)×100(%).

[Adhesion]

A release agent layer was formed as in the above release force test. The sample was stored at 25° C. and 50% RH for one week or at 60° C. and 90% RH for one week. The release agent layer was rubbed with the finger 10 strokes, after which it was visually observed for smear and rub-off and evaluated according to the following criterion.

A: no smear or rub-off
B: some smear or rub-off
C: smear or rub-off

TABLE 1

| | | A | B1 | B2 | C | Curability | Release force (N/25 mm) | Residual adhesion (%) | Adhesion 25° C./ 50% RH | Adhesion 60° C./ 90% RH | Alkenyl content B/A | H/Vi moles (C + B2)/ (A + B) |
|---|---|---|---|---|---|---|---|---|---|---|---|---|
| Example | 1 | A-1 100 pbw | B1-1 0.83 pbw | B2-1 3.3 pbw | C-1 2.2 pbw | A | 0.25 | 95 | A | A | 55.0 | 1.7 |
| | 2 | A-1 100 pbw | B1-2 1.8 pbw | B2-1 3.3 pbw | C-1 2.2 pbw | A | 0.26 | 95 | A | A | 25.0 | 1.7 |
| | 3 | A-1 100 pbw | B1-3 7.6 pbw | B2-1 3.3 pbw | C-1 2.2 pbw | A | 0.25 | 98 | A | A | 6.0 | 1.7 |
| | 4 | A-1 100 pbw | B1-4 2.3 pbw | B2-1 3.3 pbw | C-1 2.2 pbw | A | 0.25 | 97 | A | A | 20.0 | 1.7 |
| | 5 | A-1 100 pbw | B1-5 0.35 pbw | B2-1 3.3 pbw | C-1 2.2 pbw | A | 0.26 | 96 | A | A | 130.0 | 1.7 |
| | 6 | A-1 100 pbw | B1-6 0.63 pbw | B2-1 3.3 pbw | C-1 2.2 pbw | A | 0.25 | 94 | A | A | 70.0 | 1.7 |
| | 7 | A-1 100 pbw | B1-1 0.83 pbw | B2-2 3.3 pbw | C-1 2.2 pbw | A | 0.28 | 98 | A | A | 55.0 | 2.0 |
| | 8 | A-1 100 pbw | B1-1 0.83 pbw | B2-3 3.3 pbw | C-1 2.2 pbw | A | 0.25 | 98 | A | A | 55.0 | 1.7 |
| | 9 | A-1 100 pbw | B1-1 0.83 pbw | B2-5 3.3 pbw | C-1 2.2 pbw | A | 0.26 | 98 | A | A | 55.0 | 1.7 |
| | 10 | A-1 100 pbw | B1-1 0.83 pbw | — | C-1 2.2 pbw | A | 0.24 | 96 | A | B | 55.0 | 1.7 |
| | 11 | A-1 100 pbw | B1-6 0.63 pbw | — | C-1 2.2 pbw | A | 0.24 | 95 | A | B | 70.0 | 1.7 |
| | 12 | A-1 100 pbw | — | B2-1 3.3 pbw | C-1 2.2 pbw | A | 0.31 | 97 | A | A | — | 2.4 |

TABLE 1-continued

|  |  | A | B1 | B2 | C | Curability | Release force (N/25 mm) | Residual adhesion (%) | Adhesion 25° C./ 50% RH | Adhesion 60° C./ 90% RH | Alkenyl content B/A | H/Vi moles (C + B2)/ (A + B) |
|---|---|---|---|---|---|---|---|---|---|---|---|---|
|  | 13 | A-1 100 pbw | — | B2-4 3.3 pbw | C-1 2.2 pbw | A | 0.30 | 98 | A | A | — | 2.4 |
|  | 14 | A-1 100 pbw | — | B2-5 3.3 pbw | C-1 2.2 pbw | A | 0.29 | 98 | B | A | — | 2.4 |
| Comparative Example | 1 | A-1 100 pbw | — | — | C-1 2.2 pbw | A | 0.27 | 100 | B | C | — | 2.4 |
|  | 2 | A-1 100 pbw | B1-7 20.0 pbw | — | C-1 2.2 pbw | A | 0.23 | 98 | B | C | 2.0 | 1.7 |
|  | 3 | A-1 100 pbw | — | B2-6 3.3 pbw | C-1 2.2 pbw | A | 0.28 | 97 | B | C | — | 2.4 |
|  | 4 | A-1 100 pbw | — | B2-7 3.3 pbw | C-1 2.2 pbw | A | 0.27 | 97 | B | C | — | 2.4 |
|  | 5 | A-1 100 pbw | — | B2-8 3.3 pbw | C-1 2.2 pbw | C | 0.24 | 99 | A | A | 20.0 | 1.5 |
|  | 6 | A-1 100 pbw | — | B2-9 3.3 pbw | C-1 2.2 pbw | A | 0.28 | 98 | B | C | — | 2.4 |
|  | 7 | A-1 100 pbw | — | B2-10 3.3 pbw | C-1 2.2 pbw | A | 0.27 | 96 | B | C | — | 2.4 |
| Example | 15 | A-2 100 pbw | B1-1 4.8 pbw | B2-1 3.3 pbw | C-2 5.3 pbw | A | 0.73 | 94 | B | A | 13.8 | 1.2 |
| Comparative Example | 8 | A-2 100 pbw | — | — | C-2 5.3 pbw | A | 0.88 | 99 | B | C | — | 2.0 |

Examples 16 to 19 and Comparative Examples 9 to 11

A coating composition was prepared by the following procedure using the foregoing components (A) to (G) as starting materials.

Components (A) to (C) and (F) were fed into a flask in accordance with the formulation in Table 2, 3,200 parts of component (E) and 3 parts of component (G) were added thereto, and the contents were stirred and dissolved. Component (D) was added to the solution in an amount to give 100 ppm of platinum based on the weight of component (A). The solution was stirred and mixed, yielding the coating composition. Using the to coating composition, a coated article was prepared and evaluated by the above-described procedures.

TABLE 2

|  |  | A | B1 | B2 | C | F | Curability | Release force (N/25 mm) | Residual adhesion (%) | Adhesion 25° C./ 50% RH | Adhesion 60° C./ 90% RH | Alkenyl content B/A | H/Vi moles C/ (A + B) |
|---|---|---|---|---|---|---|---|---|---|---|---|---|---|
| Example | 16 | A-1 100 pbw | B1-1 1.89 pbw | B2-1 5.0 pbw | C-1 2.2 pbw | F-1 5.0 pbw | A | 0.18 | 90 | A | A | 55.0 | 1.2 |
|  | 17 | A-1 100 pbw | B1-6 1.50 pbw | B2-1 5.0 pbw | C-1 2.2 pbw | F-1 5.0 pbw | A | 0.17 | 90 | A | A | 70.0 | 1.2 |
|  | 18 | A-1 100 pbw | — | B2-1 5.0 pbw | C-1 2.2 pbw | F-1 5.0 pbw | A | 0.21 | 90 | B | A | — | 2.4 |
|  | 19 | A-1 100 pbw | B1-1 1.89 pbw | — | C-1 2.2 pbw | F-1 5.0 pbw | A | 0.13 | 89 | B | C | 55.0 | 1.2 |
| Comparative Example | 9 | A-1 100 pbw | — | — | C-1 2.2 pbw | F-1 5.0 pbw | D | 0.17 | 92 | C | C | — | 2.4 |
|  | 10 | A-1 100 pbw | — | B2-8 5.0 pbw | C-1 2.2 pbw | F-1 5.0 pbw | C | 0.15 | 89 | B | A | 20.0 | 1.2 |
|  | 11 | A-1 100 pbw | — | B2-10 5.0 pbw | C-1 2.2 pbw | F-1 5.0 pbw | D | 0.18 | 91 | C | C | — | 2.4 |

The invention claimed is:

1. A release paper or film-forming silicone composition comprising (A) 100 parts by weight of an organopolysiloxane containing at least two alkenyl groups per molecule and having an alkenyl content of 0.001 to 0.15 mol/100 g and a 30 wt % toluene dilution viscosity at 25° C. of 0.01 to 70 Pa·s, and is represented by the following general formula (5):

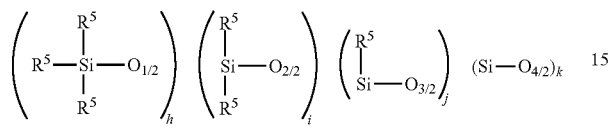

(5)

wherein each $R^5$, which may be identical or different, is independently selected from the group consisting of a substituted or unsubstituted $C_1$-$C_{20}$ monovalent hydrocarbon group free of aliphatic unsaturation and a $C_2$-$C_{12}$ alkenyl group, the monovalent hydrocarbon group being selected from the group consisting of $C_1$-$C_6$ alkyl groups, $C_6$-$C_{10}$ aryl groups, $C_7$-$C_{10}$ aralkyl groups, and 3,3,3-trifluoropropyl, the alkenyl group may contain an ether bond, wherein at least two of $R^5$ are alkenyl, wherein h, i, j and k are independently selected from a positive number to meet a viscosity in the above range, wherein h is an integer of at least 2, i is an integer of at least 100, j is an integer of at least 0, and k is an integer of at least 0, and further wherein $150 \leq h+i+j+k \leq 20,000$;

(B) an adhesion improving component comprising: compound (B1) and compound (B2):

(B1) 0.1 to 30 parts by weight of a compound containing at least two alkenyl groups per molecule, having an alkenyl content corresponding to 5 to 1,000 times the alkenyl content of component (A), being free of epoxy groups, and having a viscosity at 25° C. of less than 1 Pa·s or a 30 wt % toluene dilution viscosity of less than 0.1 Pa·s, and component (B1) being a hydrocarbon compound which has at least two alkenyl groups per molecule, may contain a hydroxyl group, and may contain an aryl group, an ether bond, or an ester bond, or an organopolysiloxane having the general formula (6)

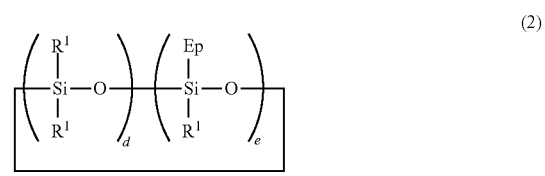

(6)

wherein $R^6$, which may be identical or different, is a substituted or unsubstituted $C_1$-$C_{20}$ monovalent hydrocarbon group free of aliphatic unsaturation or a $C_2$-$C_{12}$ alkenyl group, the monovalent hydrocarbon group being selected from the group consisting of $C_1$-$C_6$ alkyl groups, $C_6$-$C_{10}$ aryl groups, $C_7$-$C_{10}$ aralkyl groups and 3,3,3-trifluoropropyl, the alkenyl group may contain an ether bond, at least two of $R^6$ being alkenyl, m, n, o and p are independently selected from a positive number to meet a viscosity in the above range, wherein m is an integer of at least 2, n is an integer of at least 0, o is an integer of at least 0, and p is an integer of at least 0, and further wherein $2 \leq m+n+o+p \leq 502$;

(B2) 0.5 to 15 parts by weight of an organopolysiloxane containing at least 30 mol % per molecule of siloxane units having an epoxycyclohexyl group bonded to a silicon atom via a carbon atom, and further wherein the compound (B2) is free of alkenyl groups, has an average degree of polymerization of 2 to 50, and is a cyclic siloxane structure having the general formula (2):

(2)

wherein

Ep is a monovalent organic group having epoxycyclohexyl, $R^1$ which may be identical or different is a substituted or unsubstituted $C_1$-$C_{20}$ monovalent hydrocarbon group free of aliphatic unsaturation, the monovalent hydrocarbon group being selected from the group consisting of alkyl groups, aryl groups and aralkyl groups, d is an integer of 0 to 3, e is an integer of 1 to 6, d+e is 3 to 6, and are selected so as to satisfy that the organopolysiloxane contains at least 30 mol % of epoxycyclohexyl-containing siloxane units, (C) an organohydrogenpolysiloxane containing at least two silicon-bonded hydrogen atoms per molecule, and represented by the average compositional formula (7), $$R^7_s H_t SiO_{(4-s-t)/2}$$ (7)

wherein $R^7$, which may be identical or different, is a substituted or unsubstituted monovalent hydrocarbon group free of aliphatic unsaturation, the monovalent hydrocarbon group being selected from the group consisting of $C_1$-$C_6$ alkyl groups, $C_6$-$C_{10}$ aryl groups, $C_7$-$C_{10}$ aralkyl groups and 3,3,3-trifluoropropyl, s is 0.1 to 2, t is 0.1 to 3, and s+t is up to 3.1, (C) is present in such an amount that the moles of silicon-bonded hydrogen atoms corresponds to 0.5 to 10 times the moles of alkenyl groups in components (A) and (B1), (D) a catalytic amount of a platinum group metal base catalyst, (E) 0 to 20,000 parts by weight of an organic solvent or water, and (F) 0.1 to 20 parts by weight of a release force controlling component comprising an acrylic-silicone graft copolymer obtained from radical polymerization of (a) an organopolysiloxane compound having an acrylic and/or methacrylic group, represented by the general formula (3), and (b) a radically polymerizable monomer having one radically polymerizable group per molecule, the graft copolymer having a weight average molecular weight of 1,000 to 100,000,

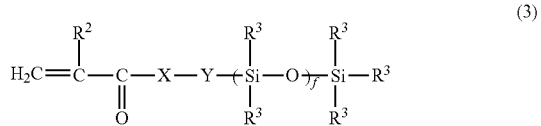

(3)

wherein $R^2$ is hydrogen or methyl, X is a group selected from oxygen, NH and sulfur, Y is a $C_1$-$C_{12}$ divalent hydrocarbon group which may contain an ether bond, $R^3$ which may be identical or different is a substituted or unsubstituted $C_1$-$C_{20}$ monovalent hydrocarbon group, hydrogen, hydroxyl, $C_1$-$C_{10}$ alkoxy group or substituent group having the general formula (4):

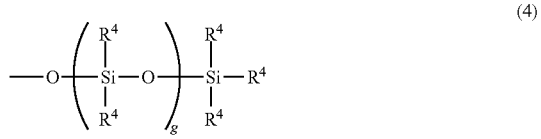

(4)

wherein $R^4$ which may be identical or different is a substituted or unsubstituted $C_1$-$C_{20}$ monovalent hydrocarbon group, hydrogen, hydroxyl or $C_1$-$C_{10}$ alkoxy group, and g is an integer of 0 to 300, wherein the silicone composition is addition curable, and wherein the weight ratio of (a) the organopolysiloxane compound having an acrylic and/or methacrylic group to (b) the radically polymerizable monomer having one radically polymerizable group per molecule ranges from 60/40 to 99/1.

2. The release paper or film-forming silicone composition of claim 1, wherein component (B2) is present in an amount of 0.5 to 5.0 parts by weight per 100 parts by weight of the organopolysiloxane as component (A).

3. The release paper or film-forming silicone composition of claim 1, wherein component (B1) is present in an amount of 0.1 to 20 parts by weight per 100 parts by weight of the organopolysiloxane as component (A).

4. The release paper or film-forming silicone composition of claim 1,
wherein component (B1) is present in an amount of 0.35 to 7.6 parts by weight per 100 parts by weight of the organopolysiloxane as component (A).

5. The release paper or film-forming silicone composition of claim 1,
wherein component (A) has a 30 wt % toluene dilution viscosity at 25° C. of 0.01 to 50 Pa·s.

6. The release paper or film-forming silicone composition of claim 1,
wherein the component (A) contains an alkenyl content of 0.001 to 0.04 mol/100 g.

7. The release paper or film-forming silicone composition of claim 1,
wherein the alkenyl content of component (B1) corresponds to 5 to 500 times the alkenyl content of component (A).

8. The release paper or film-forming silicone composition of claim 1,
wherein the alkenyl content of component (B1) corresponds to 5 to 400 times the alkenyl content of component (A).

9. The release paper or film-forming silicone composition of claim 1,
wherein the alkenyl content of component (B1) corresponds to 5 to 130 times the alkenyl content of component (A).

10. The release paper or film-forming silicone composition of claim 1,
wherein the component (B1) is the hydrocarbon compound.

11. The release paper or film-forming silicone composition of claim 1,
wherein the amount of (C) is such that the moles of silicon-bonded hydrogen atoms corresponds to 0.5 to 5 times the moles of alkenyl groups in components (A) and (B1).

12. The release paper or film-forming silicone composition of claim 1,
wherein the weight ratio of (a) the organopolysiloxane compound having an acrylic and/or methacrylic group to (b) the radically polymerizable monomer having one radically polymerizable group per molecule ranges from 85/15 to 99/1.

13. A release paper or film which is obtained by coating the release paper or film-forming silicone composition of claim 1 onto a paper or film substrate, and curing the composition.

* * * * *